United States Patent Office 2,808,581
Patented Oct. 1, 1957

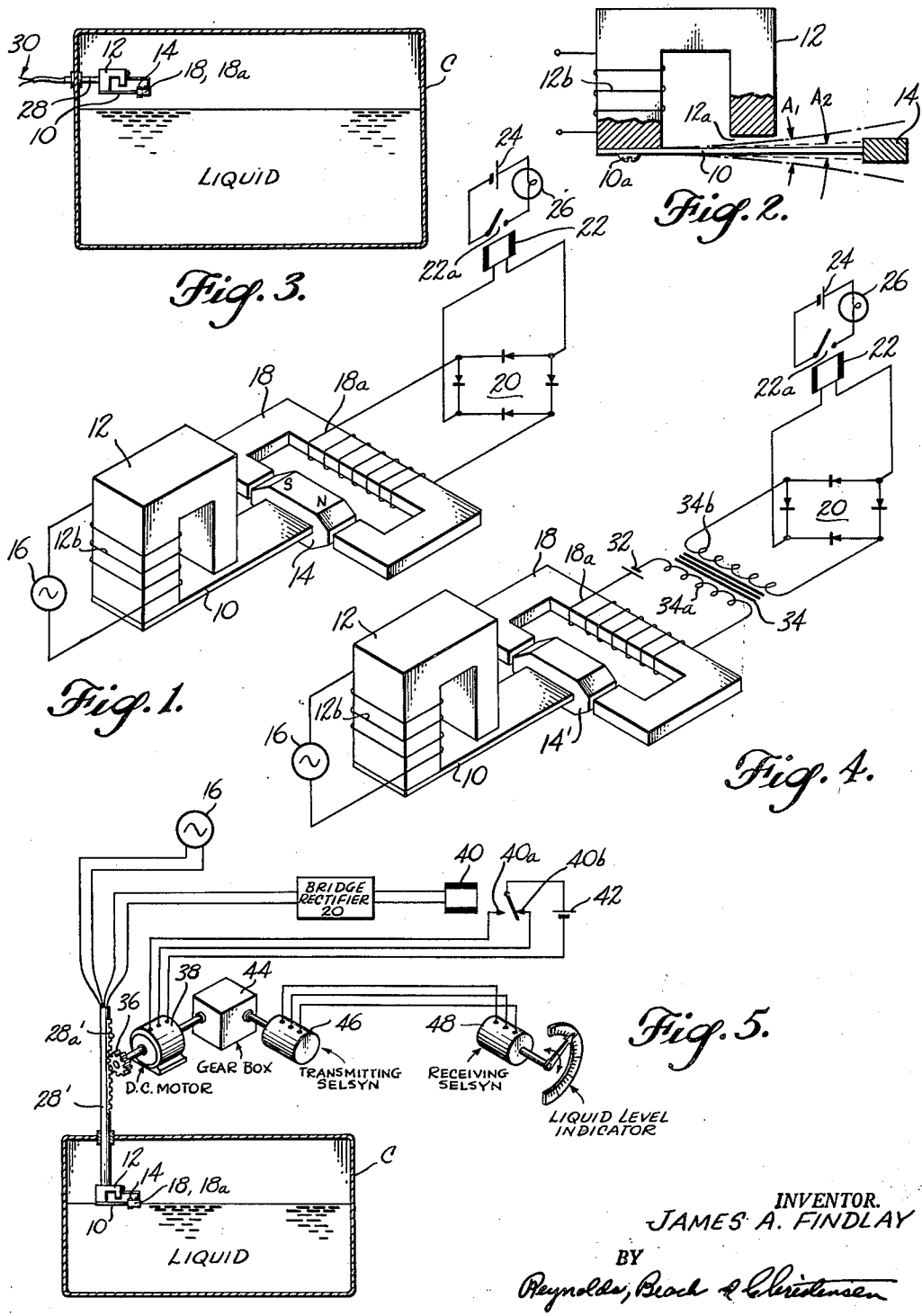

2,808,581

LIQUID LEVEL INDICATORS

James A. Findlay, Bellevue, Wash., assignor to Boeing Airplane Company, Seattle, Wash., a corporation of Delaware Application December 6, 1954, Serial No. 473,384

2 Claims. (Cl. 340—244)

This invention relates to apparatus for detecting and indicating liquid level, and more especially for determining whether the surface of a liquid body is above or below a predetermined level. The invention is herein illustratively described by reference to its application in a fuel level switch or indicator in aircraft installations; however, it will be recognized by those skilled in the art that certain modifications and variations therein may be made within the principles of the invention.

Conventional fuel level switches of the float-actuated type operable, for example, for opening or closing a set of electrical contacts when the liquid fuel in an airplane fuel tank reaches a predetermined level present problems in jet aircraft, or generally in any type of installation wherein vibration, shock, and acceleration effects are severe. An object of the present invention is to provide a liquid level switch or detector so constituted that neither its useful operating life nor its performance are influenced appreciably by these environmental factors.

Another object of the invention is a device of the type indicated capable of normal operation throughout a wide temperature range, and which during its operation will not generate any hot spots or cause electric arcing, creating danger of fire or explosion in liquid fuel tank installations.

Another object of the invention is a liquid level detector or the like avoiding the problem of corrosion, especially in the presence of hydrocarbons or other corrosive substances and an atmosphere of high humidity.

Other objects include a liquid level detector or the like requiring no bulky elements to be inserted in the liquid container, and to provide such a device which is simple, effective and reliable in operation.

In brief, the invention comprises the placement of a mechanical vibrational element within the liquid container at a predetermined level representing the desired level of liquid to be detected. Said vibrational element is mounted for free vibration within the container space, and is subjected by drive means to continuous vibrational stimulus of substantially constant amplitude, whereby said element vibrates substantially continuously at one amplitude when immersed in the liquid, and at a materially higher amplitude when out of contact with such liquid. Amplitude sensitive means operatively associated with the vibrational element responds selectively in predetermined manner to vibrations of said element at one amplitude or the other so as to indicate or determine that the level of liquid is above or below said predetermined level.

In the preferred embodiment the vibrational element comprises a resiliently flexible ferromagnetic strip which is subjected to intermittent magnetic attraction of an electromagnet energized by fluctuating currents, either direct currents or alternating currents. The vibrational element in this preferred form carries a small permanent magnet which is vibrated in the presence of an inductance coil, so as to generate a fluctuating electric signal in such coil, the amplitude of which corresponds substantially to the amplitude of vibration of the element. Such signal is detected and applied to a suitable device such as a relay, which responds selectively to detected signal amplitudes above a predetermined level so as to actuate electrical contacts and thereby indicate in a suitable electrical circuit that the liquid in the container is above or below the selected level for which the device is set to operate.

In broad terms, therefore, the invention comprises a mechanically vibrated element, means to vibrate said element continuously normally at a predetermined amplitude in a low viscosity fluid medium, whereas the amplitude of vibration of said element is materially reduced when the same becomes immersed in a relatively high viscosity fluid medium displacing the first-mentioned fluid medium in the space immediately surrounding said element, whereby the resultant change in the amplitude of vibration of said element may be detected as a means of indicating the presence or absence of the second-mentioned fluid medium.

These and other features, objects and advantages of the invention will become more fully evident from the following description thereof by reference to the accompanying drawings.

Figure 1 is a schematic diagram illustrating the principles of the invention embodied in a preferred form of apparatus.

Figure 2 is a side view of the vibrating reed in the same apparatus, illustrating the effect of the presence or absence of liquid immediately surrounding the reed on its vibrational amplitude.

Figure 3 is a simplified side elevation of a liquid storage container in which the invention is installed.

Figure 4 is a schematic view of a modified liquid level detector.

Figure 5 is a schematic view illustrating application of the invention to the indication of varying fuel levels throughout an appreciable range of variation.

Referring to Figures 1 through 3, the vibrational element comprises the resiliently flexible ferromagnetic reed, or strip, 10 fastened at one end to a generally U-shaped electromagnet core piece 12, and carrying at its opposite end a small permanent magnet 14, the north and south poles of which extend in a line transverse to the plane of vibration of said strip, which line is generally parallel to the plane of the strip and perpendicular to the vibrating length of the strip. In the example, the first-mentioned end of the reed 10 is fastened by a screw 10a to one end of the core member 12. In its relaxed position, as shown by solid lines in Figures 1 and 2, an air gap 12a exists between the opposite end of the core member 12, and the adjacent side of the vibrating strip. When electric current is passed through the inductance winding 12b wound on the core member 12, the ferromagnetic strip 10 is attracted toward the free end of the core member to decrease the air gap 12a. When this electric current is diminished or cut off, resilience of the strip returns it to its normal position. By applying fluctuating current, as from the alternating current source 16 to the coil 12b, the strip 10 is caused to vibrate at twice the alternating current frequency. For optimum results the mechanical resonance frequency of the vibrational element 10, including the permanent magnet 14 secured on the end thereof, is made equal to twice the alternating current frequency of source 16.

The permanent magnet 14 is positioned in an air gap formed in the C-shaped core member 18 of an inductance coil 18a. The ferromagnetic core member 18 forms a magnetic flux path linking the coil 18a in which path the permanent magnet 14 is serially interposed. As the permanent magnet 14 is vibrated with the reed 10, therefore, the magnetic flux from such magnet which links the coil 18 is caused to fluctuate at the vibration frequency; however, the resultant induced voltage in the coil 18a has an amplitude approximately proportional to the vibrational amplitude of the member 10 and 14. This is true because the voltage induced in the coil 18a is proportional to the rate of change of magnetic flux in the coil member 18, which, in turn, is directly related to the amplitude of vibration of the permanent magnet 14 in the air gap of such coil member.

The terminals of coil 18a are connected to opposite sides of a full-wave detector 20 whose output terminals are connected to the winding of a relay 22. The normally open contacts 22a of the relay 22 are connected in a circuit including the voltage source 24 and the electric lamp 26, which circuit is closed when the relay 22 is energized by direct current of sufficient magnitude to close the contacts.

Figure 3 illustrates the installation of the liquid sensing portion of the apparatus in a liquid container C. The sensing portion of the apparatus includes the core member 12, the vibrational reed 10 carrying the permanent magnet 14, and the core member 18 on which the inductance coil 18a is wound. These elements are depicted in Figure 3 as being carried by a support means including the mounting tube 28, extending through the container wall and serving as a conduit for electrical conductors 30 which are connected to the terminals of the coils 12b and 18a. In the example, the vibrating reed 10 is supported bodily in generally horizontal position, and the core members 12 and 18 are suitably connected to the supporting means in operative relationship with the vibrating reed.

When the surface of the liquid in container C is entirely below and out of contact with the vibrating reed 10 and permanent magnet 14, the reed will vibrate at an amplitude $A_1$ (Figure 2). Under these conditions, the relay 22 will be energized and the lamp 26 therefore illuminated to indicate that the fuel is below the predetermined level to be indicated by the apparatus. However, when the surface of the liquid rises in the container to immerse the reed and magnet, its damping effect materially reduces the vibrational amplitude to a value $A_2$. Under this latter condition, direct current flowing in the relay coil 22 becomes insufficient to hold the relay in actuated condition whereupon the contacts 22a open, and the indicator lamp 26 is no longer illuminated. Thus, the apparatus reliably indicates that the liquid level in container C is either above or below a predetermined level representing the level at which the vibrating reed 10 is mounted for free vibration therein.

Figure 4 illustrates a modification wherein the magnetic means 14' mounted on the end of the vibrating reed 10 is not a permanent magnet, but a ferromagnetic element having low magnetic retentivity. In this case, direct current from a source 32 is passed through the inductance coil 18a, and through the primary 34a of an output transformer 34, connected serially with the source 32 and the inductance winding 18a. The output winding 34b of the transformer is connected to the input terminals of the bridge circuit 20 as in the preceding example. In this case, vibration of the ferromagnetic bar or element 14' in the air gap of the core member 18 changes the magnetic reluctance of the magnetic flux path defined by the core member and which links the inductance coil 18a. As a result, the magnetic flux set up in this path by direct current flow through the inductance member fluctuates and produces an alternating signal in the transformer output winding 34b. The results are similar to those in the preceding example.

Referring to Figure 5, the sensing mechanism in the liquid level detector apparatus is mounted on the slide tube 28', extending vertically through the top wall of the liquid container C and vertically adjustable therein to permit raising and lowering such sensing means in the container. Such slide tube serves as a conduit for the electrical conductors interconnecting the alternating current source 16 and the coil 12b, and the inductance coil 18a and the bridge rectifier circuit 20. Also, gear teeth 28'a are formed along the side of the slide tube 28' which mesh with a spur gear 36 driven by a D. C. motor 38, stationarily mounted with respect to the container C. In this case, the output of the bridge rectifier circuit 20 is applied to a motor control relay 40, having alternatingly engageable contacts 40a and 40b, by which the direct voltage of a source 42 is applied to the oppositely acting control windings (not shown) of the D. C. motor 38, in order to cause the motor to rotate in one direction or the other, and thereby to raise or lower the slide tube 28'.

The existing position of the slide tube 28', hence, of the level sensing apparatus comprising the vibrating reed 10 and associated components, is remotely indicated by a level indicator as shown in the drawing. This is accomplished by connecting the shaft of D. C. motor 38 through a gear box 44 to the rotatable element of the transmitting selsyn 46, the windings of which are connected to the rmeote receiving selsyn 48. The speed reduction ratio of the gear box 44 is so correlated with the markings on a liquid level indicator scale that the level indicator pointer positioned by the receiving selsyn provides a true indication of the existing vertically adjusted position of the slide tube 28' and associated liquid level sensing apparatus carried on the inner end thereof.

In operation, when the level of liquid in the container C drops below the vibrating element 10, the amplitude of vibration thereof materially increases, which causes energization of relay 40 and closure of relay contact 40a to energize the D. C. motor 38 in a sense to lower the slide tube and associated sensing mechanism. Such downward movement of the slide tube continues until the vibrating reed 10 is again immersed in the liquid, whereupon the relay 40 is deenergized, and the contacts 40b are closed, reversing the energization of the D. C. motor. The D. C. motor thereby causes the level sensing mechanism to oscillate up and down about the correct position to indicate on the level indicator scale, by its average position, the true level of liquid in the container C at all times.

It will be apparent that, instead of operating a servo motor or illuminating an indicator lamp, for instance, the sensing apparatus may be arranged to operate other types of indicators or controls in accordance with level of fuel in the container. For instance, in the case of installations similar to Figure 3 representing an airplane fuel tank which is to be filled with liquid fuel, the apparatus could be utilized to sense the rise of liquid level in the container to a predetermined level representing the desired maximum level, whereupon a suitable control for shutting off the supply of fuel to the container may be actuated.

It will be recognized that the various objects of the invention set forth at the outset herein are achieved by the novel liquid level detecting apparatus and that the specific form of such apparatus, and particularly the details of form of the vibrational element, of the means for applying vibrational stimulus thereto, of the means for detecting the amplitude of vibration of such element as a means of sensing the presence or absence of liquid in which said element is immersed, and also the supporting means, may vary with choice or design requirements.

I claim as my invention:

1. In combination, a container for liquid, a mechanical vibrational element, support means operatively positioning said element in said container at a predetermined level of liquid to be detected therein, said vibrational element being directly exposed to the contents of said container at said level and being supported to permit substantially free vibration of said element, drive means operatively arranged with respect to said element and energizable for imparting substantially continuous vibrational stimulus to said element of substantially constant amplitude, whereby said vibrational element vibrates substantially continuously at one amplitude when immersed in liquid in said container and at a materially higher amplitude when the level of liquid in said container is below and out of contact with said vibrational element, and indicator means connected to be operated by vibration of said element and adapted to indicate vibration of said element at said materially higher amplitude distinguishably from vibration thereof when immersed in the liquid.

2. The combination defined in claim 1, wherein the vibrational element comprises resiliently flexible reed mean comprising ferromagnetic material, the drive means comprises an electromagnet energizable by fluctuating current of predetermined frequency to vibrate said reed by magnetic force impulses applied thereto, and the electrically responsive means comprises a permanent magnet member and an inductance coil member, one of said members being connected to said support means and the other of said members being operatively connected to said vibrating reed means for producing relative movement between said permanent magnet member and said inductance coil member to induce fluctuating voltage in said inductance coil member proportional in amplitude to the amplitude of vibration of said reed, and the indicator means comprises electrical means connected to be energized by said inductance coil member and adapted to indicate flow of induced currents therein above a predetermined amplitude corresponding to the amplitude of vibration of said reed when the level of liquid in said container is below said predetermined level.

References Cited in the file of this patent

UNITED STATES PATENTS

| | | |
|---|---|---|
| 2,097,182 | Dodge | Oct. 26, 1937 |
| 2,411,248 | Cohen | Nov. 19, 1946 |
| 2,414,756 | May | Jan. 21, 1947 |
| 2,472,249 | De Giers | June 7, 1949 |
| 2,615,080 | Mathews et al. | Oct. 21, 1952 |
| 2,668,365 | Hogin | Feb. 9, 1954 |
| 2,691,223 | Oberlin | Oct. 12, 1954 |

FOREIGN PATENTS

| | | |
|---|---|---|
| 674,497 | Germany | Apr. 14, 1939 |